June 18, 1968　　　　JAMES E. WEBB　　　　3,389,017
ADMINISTRATOR OF THE NATIONAL AERONAUTICS
AND SPACE ADMINISTRATION
SEALING MEMBER AND COMBINATION THEREOF AND METHOD OF
PRODUCING SAID SEALING MEMBER Filed Dec. 16, 1964　　　　　　　　　　　3 Sheets-Sheet 1

Thomas E. O'Rourke, Jr.
INVENTOR.

BY
Marvin J. Matthews
ATTORNEYS

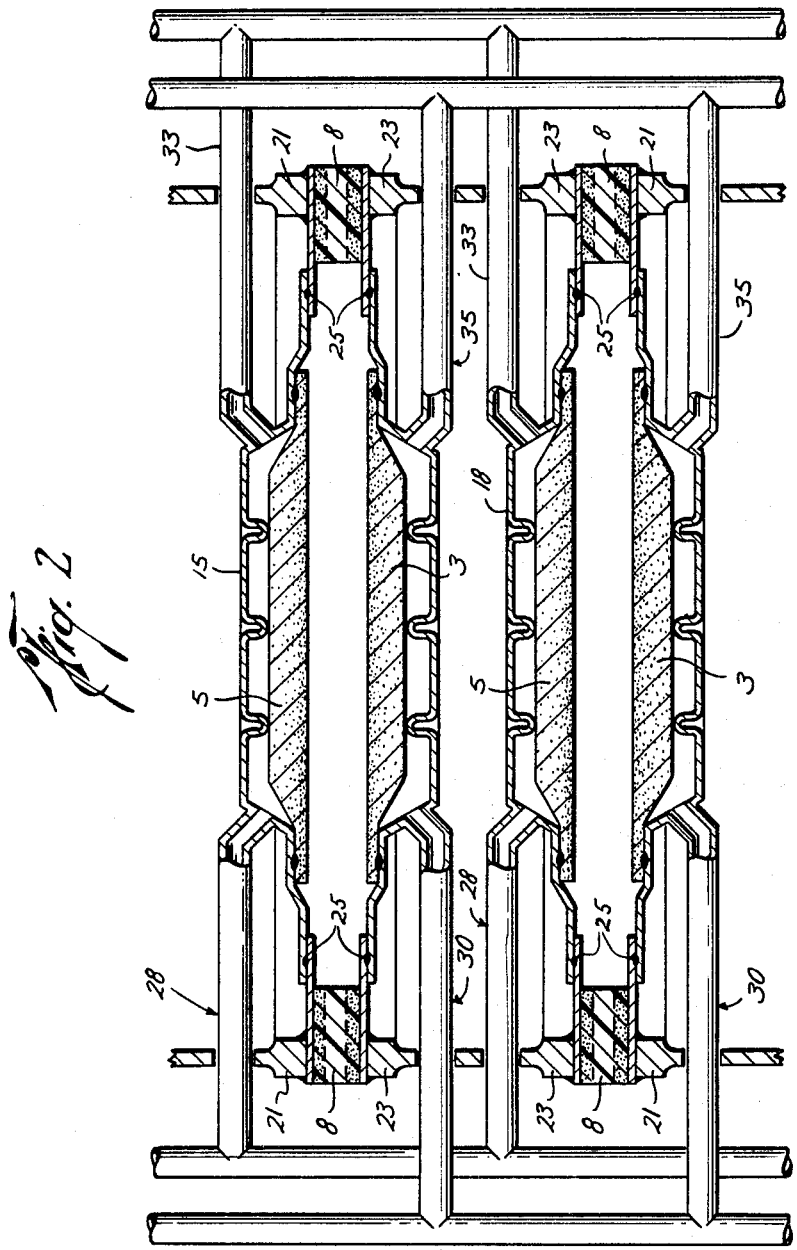

June 18, 1968 JAMES E. WEBB 3,389,017
ADMINISTRATOR OF THE NATIONAL AERONAUTICS
AND SPACE ADMINISTRATION
SEALING MEMBER AND COMBINATION THEREOF AND METHOD OF
PRODUCING SAID SEALING MEMBER
Filed Dec. 16, 1964 3 Sheets-Sheet 3
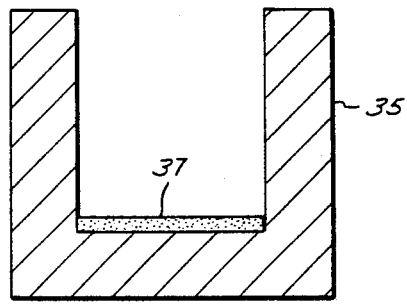
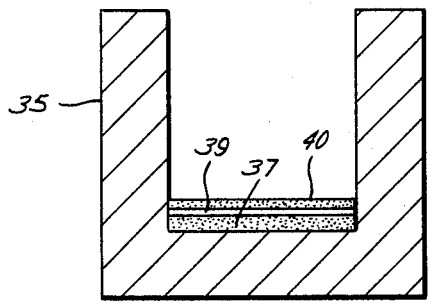
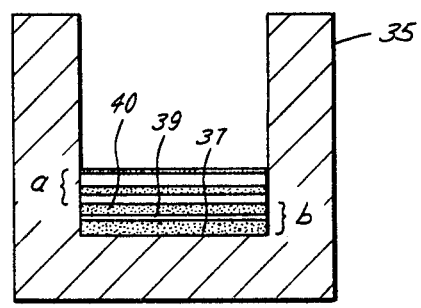
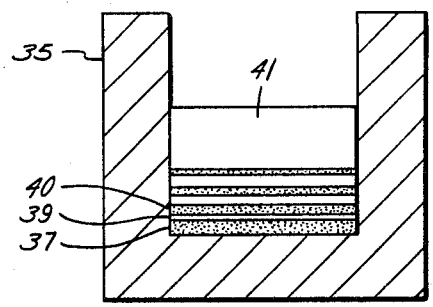
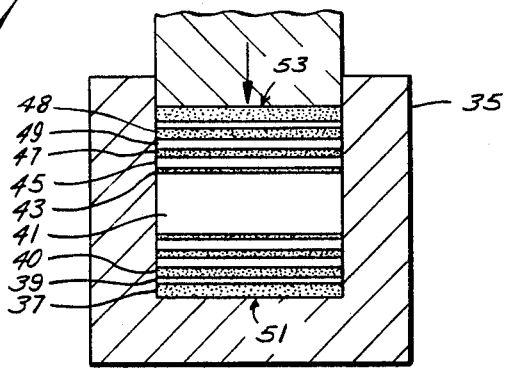
Thomas E. O'Rourke, Jr.
INVENTOR.
ATTORNEYS United States Patent Office 3,389,017
Patented June 18, 1968

3,389,017
SEALING MEMBER AND COMBINATION THEREOF AND METHOD OF PRODUCING SAID SEALING MEMBER
James E. Webb, Administrator of the National Aeronautics and Space Administration, with respect to an invention of Thomas E. O'Rourke, Jr., Glastonbury, Conn.
Filed Dec. 16, 1964, Ser. No. 418,933
12 Claims. (Cl. 136—86)

ABSTRACT OF THE DISCLOSURE

A sealing member for sealing between the electrodes of a fuel cell containing a caustic liquid electrolyte. The sealing member includes a central portion of corrosion resistant powdered plastic material and reinforcement portions on both sides of the central portion which comprise alternate layers of powdered metal and powdered plastic wherein the plastic is of decreasing concentration in inverse proportion to distance from the electrically insulative central portion. The outer layer is metal to permit welding to a electrode. Construction is accomplished by laying down the successive layers of powdered metal and powdered plastic in a mold and sintering under elevated temperature and pressure.

Figure 1:
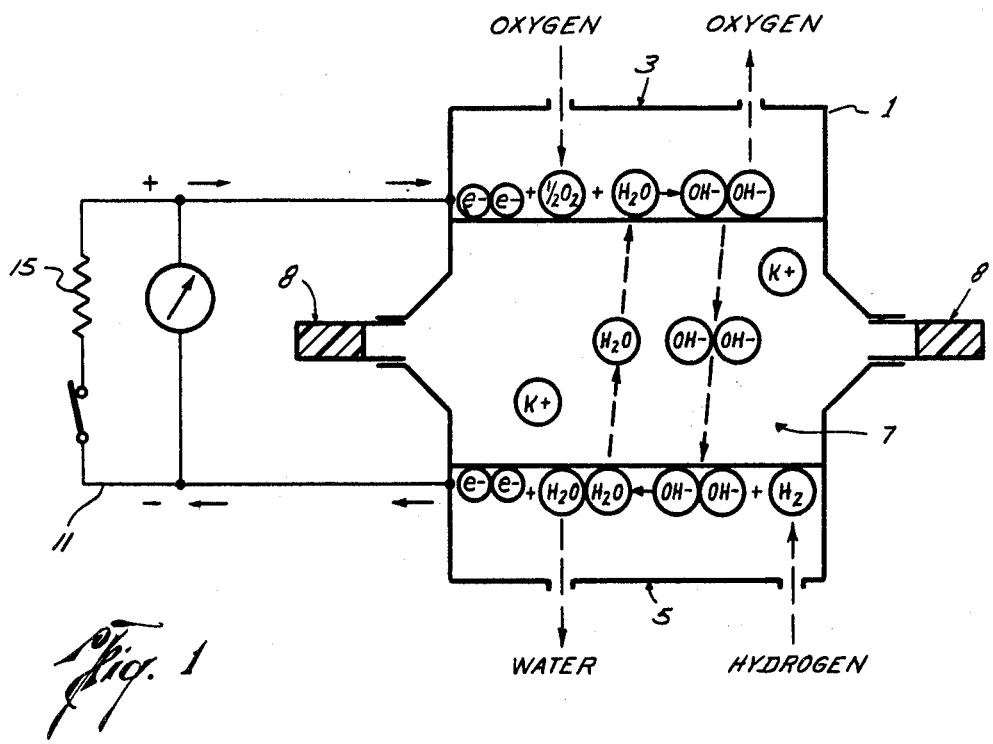

The invention described herein was made in the performance of work under a NASA contract and is subject to the provision of section 305 of the National Aeronautics and Space Act of 1958, Public Law 85–568 (72 Stat. 435; U.S.C. 2457).

This invention relates to liquid electrolyte fuel cells and, more particularly, to a sealing and insulating means therefor.

Power generating devices that convert chemical energy directly into electricity have received the intense attention of both government and industry in recent years because they possess numerous potential uses and proven advantages over other types of power sources. Such devices, generically referred to as fuel cells, exhibit operating characteristics far and above that which is achieved with more conventional power generating means. For example, due to their inherent circumvention of the frictional losses present in a heat engine, the fuel cell may typically evidence operating efficiencies on the order of 55 to 70 percent and are believed capable of even higher efficiencies after further development. In view of the comparatively low efficiencies (20 to 40 percent) obtained in other power generating devices, such as internal combustion engines, boilers, and turbines, it is seen that the efficiency factor alone confers on the fuel cell an important advantage. In addition, fuel cells are characterized by their compactness, reliability, and substantial absence of moving parts. Despite these recognizable attributes, certain deficiencies exist in the present technology of the fuel cell which detract from its otherwise favorable characteristics. One of these deficiencies resides in the sealing member, or gasket, which is disposed between the electrodes of liquid electrolyte type cells, and whose function it is to seal the electrolyte within the cell and electrically insulate the electrodes from each other.

Since the seal, which insulates the electrodes, is in continuous contact with a caustic electrolyte, such as a solution of potassium hydroxide or sodium hydroxide inside the fuel cell, it must be made of a material which is both corrosion resistant and electrically insulative. For these reasons fuel cell seals are commonly made of an inert plastic, such as nylon, or, preferably polytetrafluoroethylene, available commercially as Teflon. Although seals made from these materials perform satisfactorily at low pressures or temperatures, there is a gradual weakening of their structural integrity at higher temperatures and pressures resulting in movement of the seal between the electrodes it is insulating. This movement, or "creep," is a function of both high temperature and pressure, and as a consequence there is a tendency for the liquid electrolyte to leak from within the cell at points between the electrode and the seal. The leakage of the electrolyte leads to increased maintenance or even reduced life for the cell.

With the above problems in view, the present invention consists of a plastic member having varying amounts of metal powder embedded therein in such a manner as to enable weldment of the plastic seal to the electrode to thereby prevent its movement at the welded points. Despite the metal powder in the seal, there remains an effective insulating center section which also serves to absorb the expansion of the cell without causing relative movement of the cell and seal. There results a construction which reduces the creep rate because of the metal embedded therein, and which precludes electrolyte leakage from the cell by reason of its integral connection thereto. Additionally, an improved method for constructing and attaching the seal to the electrodes is disclosed.

Since the numerous features and advantages of this improved seal will be more readily apparent in light of the following specification and accompanying drawings in which like numerals denote like parts, reference is made thereto, wherein:

FIG. 1 schematically illustrates the power generating operation of a conventional liquid-electrolyte type fuel cell;

FIG. 2 illustrates in cross section the conventional arrangement of a series of stacked fuel cell plates showing therein the insulating position of the seal with respect to the electrodes of each cell plate; and FIG. 3 illustrates the improved fuel cell seal and the steps for constructing same.

With reference to FIG. 1, there is shown a conventional fuel cell 1 consisting of two porous electrodes 3, 5 enclosing an electrolyte 7, such as a solution of sodium hydroxide, potassium hydroxide, or other appropriate medium which efficaciously undergoes chemical decomposition by the direct action of an electric current passing therethrough. Seal member 8 insulates the electrodes from each other. On the anode side 5 of the cell, hydrogen gas is fed into and diffuses through the electrode pores, contacts the catalyst in the electrode and becomes ionized, thereby surrendering electrons ($e^-$) which constitute the source of the circuit's electric flow.

Meanwhile oxygen similarly diffuses at the oxidizer electrode 3, or cathode, comes in contact with a catalyst in that electrode, and reacts with water in a process to yield hydroxyl ions. The electrons generated at the anode pass through an external circuit 11 to the cathode where they are consumed by the process there, their electrical charge being transferred to the hydroxyl ions. The hydroxyl ions migrate through the electrolyte 7 to the fuel electrode thus completing the electric circuit. The circuit may be tapped at some point as indicated at 15. The hydroxyl ions and hydrogen ions react at the fuel electrode (anode) to produce water, part of which travels through the electrolyte to the cathode 3 where it partakes in the hydroxyl forming reaction.

The net reaction at cathode 3 is summarized by $$\tfrac{1}{2}O_2 + H_2O + 2e^- \rightarrow 2OH^-$$

while the two successive reactions at anode 5 are $$H_2 \rightarrow 2H^+ + 2e^-$$
$$2H^+ + 2OH^- \rightarrow 2H_2O$$

and the net effect for the entire cell is merely $$H_2 + \tfrac{1}{2}O_2 \rightarrow H_2O$$

The chemical action illustrated in FIG. 1 is more realistically shown in the illustration of an actual fuel cell as indicated by FIG. 2 in which an electrolyte, such as potassium hydroxide, is placed between each of a series of individual cells 15, 18 having electrode plates 3, 5 coated with a conventional corrosion resistant metal, such as nickel, and having a fuel cell seal 8 inserted therebetween each. Cell seals 8 are disposed between each pair of electrodes in the bank of cells (of which only cells 15, 18 are shown), and, as indicated above, are constructed from an inert material such as Teflon. The seal is held in its relatively immovable position by the current conductive supports, or spacers 21, 23 which are structurally designed not only to conduct a current around the cell, thereby constituting a part of the circuit, but to exert sufficient physical force upon the electrodes of adjacent cells to preclude leakage of the electrolyte between the seal and the electrode.

Each cell in the bank of FIG. 2 receives hydrogen fuel at intake 28 and oxygen at intake 30. The reaction between the electrodes 3, 5 is the same as that explained with respect to FIG. 1. The hydrogen and oxygen are removed at respective ports 33, 35.

The electrode seal arrangement of FIG. 2 has, in most instances, been found to sufficiently insulate the electrodes and retain the electrolyte therein under lower pressures and temperatures. However, as previously noted, the plastic seal 8 becomes more elastic when relatively high temperatures and pressures are maintained within the cell thereby resulting in the creep between the seal and the electrodes 3, 5 which causes leakage of electrolyte. This primary disadvantage has been overcome by the seal construction and method of the subject invention in which varying amounts of nickel powder are imparted to the Teflon seal so as to enable subsequent weldment of the seal itself to the nickel coated electrodes of the cell, as shown at 25 in FIG. 2.

In FIGS. 3A–3G, there is shown a series of steps for laying down the constituent powders for the subject seal.

On the bottom of a mold 35, as shown in FIG. 3A, there is placed a thin layer 37 of nickel powder. Directly over this layer is placed a second layer 39 consisting of Teflon powder (FIG. 3B) of somewhat thinner thickness than the nickel layer. Alternate layers 40, etc. of nickel and Teflon powder are then subsequently placed over the initial nickel and Teflon layers 37, 39 until a thickness of about 30 to 40 percent of the mold depth is reached (FIG. 3C). In laying down each of these layers, however, a gradually increasing thickness of Teflon powder is deposited whereas the nickel layers remain fairly constant in their thickness or may even decrease. It is the object in depositing these layers to have at area $b$ of FIG. 3C a composition, which is predominantly nickel, whereas the mixture at area $a$ is predominantly Teflon. After this first section of the seal is laid down, an intermediate layer 41 of Teflon is deposited in the mold. The intermediate layer, as shown in FIG. 3D, should cover 20 to 35 percent of the mold thickness and will constitute the insulating section of the seal between the electrodes. Directly over the Teflon layer 41, as shown in FIG. 3E, is placed a thin layer of nickel 43 and thereover a layer of Teflon 45. Alternate layers of nickel 47, 48, etc. and Teflon 49, respectively, are thereafter laid on top of each other in such a manner as to accomplish the same composition of structure as is present in the bottom portion of the seal (refer to FIG. 3C), that being with the thickness of nickel increasing with each subsequent layer deposited upon the center Teflon-insulating section. The relative thickness of the final structure may be as shown in FIG. 3E. There thus results a seal structure, which is composed of varying amounts of nickel and Teflon, with the center portion being pure Teflon and the percentage of nickel to Teflon increasing as the side surfaces 51, 53 of the seal are approached.

After the mold has been filled, the seal is sintered in accordance with well-known procedures for this purpose. This may take place at temperatures of 720° to 820° F. under a pressure of about 20,000 pounds p.s.i. for a period of 20 to 30 minutes. In this manner the constituent powders fuse together and yet maintain their relative position with respect to the over-all seal thickness. After the seal has cooled, it is removed from the mold to be machined to necessary tolerances. When this is completed a thin layer, .0001 to .0005 inch, of nickel is vapor deposited on each of the surfaces 51, 53 of the seal. A bond is thus formed between the vapor deposited nickel and the exposed surfaces of nickel powder impregnated in the seal.

Figure 3F:
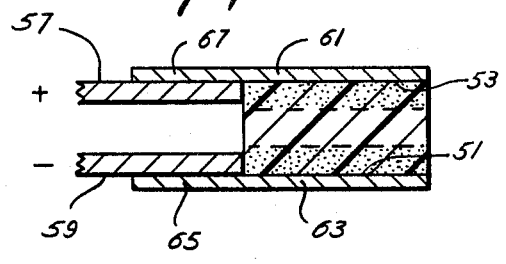
Figure 3G:
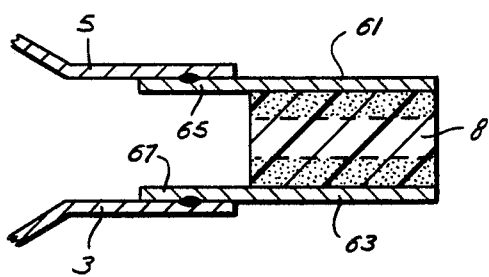

The seal is then removed to a nickel plating bath to receive a final and substantial nickel coating, the thickness of which should be sufficient enough to permit welding to electrodes of the cell. With the seal in a nickel plating bath, the plating electrodes 57, 59 are positioned to the machined and vapor coated seal, as shown in FIG. 3F, until the layers 61, 63 are built up on seal surfaces 51, 53. The electrodes are then removed and the seal trimmed to the proper size. Extensions 65, 67 are then welded to the electrodes of the cell, such as by electron beam welding. The completed seal 8 attached to the cell may be visualized as in FIG. 3G wherein a completely unitary cell-seal construction is formed to hermetically contain the electrolyte within cell, and in which expansion and contraction of the seal may take place without the slightest leakage between the cell electrodes.

It should be recognized that the foregoing disclosure relates only to a preferred form of the invention, and that it is intended to cover all changes and modifications of the material and procedures, which are within the spirit and scope of the invention, as defined in the appended claims.

What is claimed and described to be secured by Letters Patent is:

1. The method of constructing a sealing member comprising the steps of:
    disposing a first relatively thick layer of metal powder on the bottom of a mold;
    laying a first relatively thin layer of plastic powder over said metal powder;
    laying subsequent, alternate layers of metal powder and plastic powder layers, with the relative thickness of each metal layer decreasing, and with the relative thickness of each plastic player increasing, each with respect to prior layers of each;
    laying down a relatively thick central layer of powdered plastic on top of the last plastic layer;
    laying a first relatively thin metal powder layer on said thick central layer;
    laying down a first relatively thick plastic layer on the metal powder layer;
    laying down alternate layers of metal and plastic thereafter with the relative thickness of each plastic layer decreasing, and the relative thickness of each metal layer increasing, each with respect to the prior layers of each, said layers over said central layer being substantially the same total thickness as the layers under said central layer; and
    sintering the filled mold under elevated temperature and pressure for a time sufficient to achieve a unitary seal structure.

2. The steps in the method of claim 1 wherein an additional step includes that of removing the seal from the mold and applying, by vapor deposition, a metallic coating to the exposed metal containing sides of said seal.

3. The steps of the method in claim 1 wherein an additional thicker coating of metal is electroplated on to said vapor coating.

4. The steps of the method in claim 1 wherein the plastic powder is polytetrafluoroethylene.

5. The steps in the method of claim 2 wherein all the plastic is polytetrafluoroethylene and all the metal is nickel.

6. A molded and sintered electrical insulator and sealing means of composite structure for connection to the electrodes of a liquid electrolyte fuel cell comprising:
  a central portion of electrically nonconductive plastic material;
  a reinforcement portion on both sides of said central portion, each said reinforcement portion comprising a plurality of layers of mixtures of metal material and plastic material wherein the plastic in each said reinforcement portion is of decreasing concentration as the distance from said central portion increases, each said reinforcement portion including a metal outer layer to permit welding to an electrode.

7. An electrical insulator and sealing means as described in claim 6 wherein said plastic material in said central portion and said reinforcement portions is polytetrafluoroethylene.

8. An electrical insulator and sealing means as described in claim 6 wherein said metal is nickel.

9. In combination, a chemical-electrical power conversion cell having a caustic electrolyte contained between a pair of electrodes, and sealing means therebetween for electrically insulating said electrodes from each other and for precluding leakage of electrolyte from the cell, said sealing means comprising:
  a central portion of electrically nonconductive and corrosion resistant plastic material;
  a reinforcement portion on both sides of said central portion, each said reinforcement portion comprising a plurality of layers of mixtures of powdered metal and powdered plastic material wherein the plastic in each said reinforcement portion is of decreasing concentration as the distance from said central portion increases, each said reinforcement portion including an outer metal layer welded to one of said electrodes whereby said sealing means is disposed in electrically insulative and sealing relationship between the electrodes of said cell.

10. A chemical-electrical power conversion cell and sealing means as described in claim 9 wherein said plastic material in said central portion and said reinforcement portions is polytetrafluoroethylene.

11. A chemical-electrical power conversion cell and sealing means as described in claim 9 wherein said metal is nickel.

12. A chemical-electrical power conversion cell and sealing means as described in claim 9 wherein said metal and plastic materials are bonded by sintering.

References Cited

UNITED STATES PATENTS

| | | | |
|---|---|---|---|
| 3,126,302 | 3/1964 | Drushella | 136—86 |
| 3,287,202 | 11/1966 | Petriello. | |
| 3,297,484 | 1/1967 | Niedrach. | |
| 2,638,523 | 5/1953 | Rubin | 117—71 |

WINSTON A. DOUGLAS, *Primary Examiner.*

ALLEN B. CURTIS, *Examiner.*

H. FEELEY, *Assistant Examiner.*